United States Patent
Chai et al.

(10) Patent No.: US 10,169,572 B2
(45) Date of Patent: Jan. 1, 2019

(54) STARTING AN APPLICATION ON A MOBILE DEVICE

(71) Applicant: CHINA UNIONPAY CO., LTD., Shanghai (CN)

(72) Inventors: Hongfeng Chai, Shanghai (CN); Zhijun Lu, Shanghai (CN); Shuo He, Shanghai (CN); Yu Zhou, Shanghai (CN); Wei Guo, Shanghai (CN); Dingzhou Li, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 199 days.

(21) Appl. No.: 14/779,211

(22) PCT Filed: Mar. 17, 2014

(86) PCT No.: PCT/CN2014/073553
§ 371 (c)(1),
(2) Date: Sep. 22, 2015

(87) PCT Pub. No.: WO2014/154098
PCT Pub. Date: Oct. 2, 2014

(65) Prior Publication Data
US 2016/0048675 A1 Feb. 18, 2016

(30) Foreign Application Priority Data
Mar. 28, 2013 (CN) .......................... 2013 1 0104095

(51) Int. Cl.
*G06F 21/00* (2013.01)
*H04L 29/06* (2006.01)
(Continued)

(52) U.S. Cl.
CPC .......... *G06F 21/51* (2013.01); *H04L 12/6418* (2013.01); *H04W 12/06* (2013.01); *G06F 2221/034* (2013.01)

(58) Field of Classification Search
CPC ............... G06F 21/51; G06F 2221/034; H04L 12/6418; H04W 12/06
See application file for complete search history.

(56) References Cited

U.S. PATENT DOCUMENTS 7,289,975 B2 * 10/2007 Clarke .................... H04L 67/04
8,086,844 B2 * 12/2011 Buer ....................... G06F 21/57
709/223
(Continued)

FOREIGN PATENT DOCUMENTS

CN           1867913 A    11/2006
CN         102047223 A     5/2011
(Continued)

*Primary Examiner* — Lisa C Lewis
(74) *Attorney, Agent, or Firm* — The Ollila Law Group LLC

(57) ABSTRACT

The invention relates to management of programs on a mobile device, and in particular, to a method for activating application programs on a mobile device, and a mobile device based on this method. The method for activating application programs on a mobile device according to an embodiment of the invention comprises the following steps: receiving an application request from a device which is located outside the mobile device; identifying a transmission protocol associated with the application request; and if there are a plurality of safety entities in the mobile device which support the transmission protocol and store application programs associated with the application request, activating an application program associated with the application request in a default safety entity.

12 Claims, 3 Drawing Sheets

(51) Int. Cl.
  *G06F 21/51* (2013.01)
  *H04W 12/06* (2009.01)
  *H04L 12/64* (2006.01)

(56) References Cited

U.S. PATENT DOCUMENTS

| | | | |
|---|---|---|---|
| 2004/0205164 A1 | 10/2004 | Jacobs et al. | |
| 2005/0041686 A1* | 2/2005 | Roy | H04L 51/066 370/466 |
| 2007/0278290 A1* | 12/2007 | Messerges | G06Q 20/10 235/380 |
| 2009/0290712 A1 | 11/2009 | Henry et al. | |
| 2010/0077468 A1 | 3/2010 | Pragides et al. | |
| 2012/0032789 A1* | 2/2012 | Ichimaru | G06Q 20/3226 340/10.5 |
| 2012/0098819 A1* | 4/2012 | Furuya | G02B 5/32 345/212 |
| 2012/0209749 A1 | 8/2012 | Hammad et al. | |
| 2013/0124851 A1* | 5/2013 | Kain | H04L 63/0428 713/151 |
| 2015/0190062 A1* | 7/2015 | Han | A61B 5/7221 600/479 |
| 2016/0255183 A1* | 9/2016 | Ho | G06F 13/4027 455/558 |

FOREIGN PATENT DOCUMENTS

| | | |
|---|---|---|
| CN | 102047748 A | 5/2011 |
| CN | 102375998 A | 3/2012 |
| CN | 102811376 A | 12/2012 |
| EP | 1802148 A1 | 6/2007 |
| WO | 2007044500 A2 | 4/2007 |

\* cited by examiner

STARTING AN APPLICATION ON A MOBILE DEVICE

FIELD OF THE INVENTION

The present invention relates to program management on a mobile device, and in particular, to a method for activating application programs on a mobile device, and a mobile device for implementing the same.

BACKGROUND

With rapid development of broad band wireless access technology and mobile terminal technology, the mobile internet has arisen at the right moment and has become the most fast growing, the most potential and the most promising market. Business based on mobile internet is penetrating into various aspects of our daily lives, such as social intercourse, purchase, financial transactions, livelihood information acquisition or the like. Some mobile internet businesses involve the storing, reading and transmitting of sensitive information (such as privacy of users, ID and password, etc), and a safety mechanism is therefore required for protection.

By providing a safety entity (SE) in a mobile device, a safety protection can be provided to sensitive information. The safety entity means a separate hardware module having a computing and storing function. On one hand, the safety entity is configured to protect the safety of the stored data, and on the other hand, the safety entity further provides an invokable safety mechanism service for an external device. Examples of safety entities include, but are not limited to, SIM card and smart SD card or the like.

A plurality of safety entities are usually installed on one mobile device, and may store identical application programs. Therefore, when an external device requests activating such an application program, the mobile device will face a plurality of options. As can be seen from the above, there is a need for a method which can manage the activation of application programs on a mobile device.

SUMMARY OF THE INVENTION

One of the objects of the invention is to provide a method for activating application programs on a mobile device, which has such advantages as being simple and flexible, etc.

The method for activating application programs on a mobile device according to an embodiment of the invention comprises the following steps:

receiving an application request from a device which is located outside the mobile device;

identifying a transmission protocol associated with the application request; and if there are a plurality of safety entities in the mobile device which support the transmission protocol and store application programs associated with the application request, activating an application program associated with the application request in a default safety entity.

In the above method, the transmission protocol is based on near field communication technology, Bluetooth technology and WiFi technology.

Preferably, in the above method, each of the application programs is given a unique identifier in the mobile device.

Preferably, in the above method, a correlation between the safety entity and the transmission protocol which it supports is stored in the mobile device in a form of list.

Preferably, in the above method, a correlation between the application program and the default safety entity is stored in the mobile device in a form of list.

Preferably, in the above method, if the application program in the default safety entity has failed to be activated or performed, application programs associated with the application request in other safety entities are activated in a predetermined sequence.

Preferably, in the above method, if the application program in the default safety entity has failed to be activated or performed, other safety entities are set as the default safety entity.

Another object of the invention is to provide a mobile device which can realize an efficient management of application program activation.

The mobile device according to an embodiment of the invention comprises:

one or more safety entities configured to store application programs;

a communication manager configured to, in response to an application request from a device which is located outside the mobile device, activates the operation of an application program associated with the application request; and an interface between the safety entity and the communication manager, wherein the communication manager activates the operation of an application program associated with the application request in the following way: if there are a plurality of safety entities which support the transmission protocol associated with the application request and store application programs associated with the application request, the communication manager activates an application program associated with the application request in a default safety entity.

In the above mobile device, the communication manager is an integrated circuit chip having a near field communication function, and the interface conforms to NCI specifications.

Preferably, in the above mobile device, each of the application programs is given a unique identifier in the mobile device.

Preferably, the above mobile device further comprises an erasable non-volatile memory configured to store a list of correlation between the safety entity and the transmission protocol which it supports.

Preferably, the above mobile device further comprises an erasable non-volatile memory configured to store a list of correlation between the application program and the default safety entity.

Preferably, in the above mobile device, if the application program in the default safety entity has failed to be activated or performed, the communication manager activates application programs associated with the application request in other safety entities in a predetermined sequence.

Preferably, in the above method, if the application program in the default safety entity has failed to be activated or performed, the communication manager sets other safety entities as the default safety entity.

BRIEF DESCRIPTION OF THE DRAWINGS

The above and other objects and advantages of the invention will be more fully understood from a detailed description given below with reference to the accompanying drawings.

DETAILED DESCRIPTION OF THE INVENTION

Figure 1:
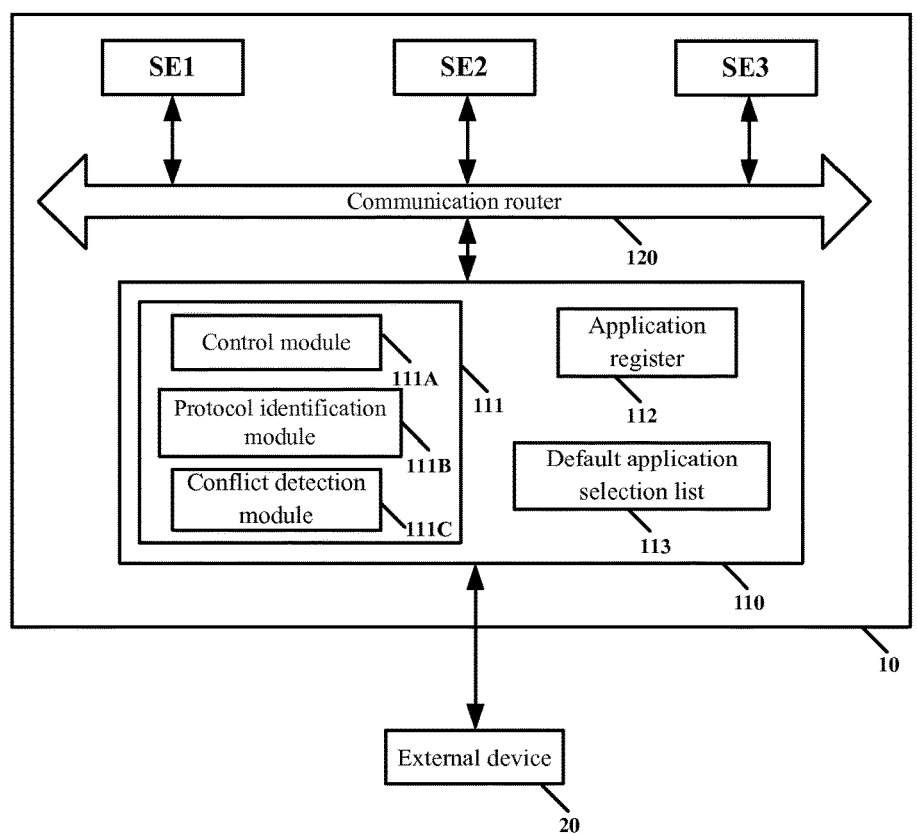
FIG. 1 shows an architecture for a mobile device according to an embodiment of the invention.

The invention will be described hereinafter with reference to specific embodiments shown in the drawings. However, it is understood that these specific embodiments are merely exemplary, and has no limitation to the spirit and scope of protection of the invention.

In the specification, such terms as "contain" and "comprise" mean that in addition to the inclusion of units and steps that are directly and definitely recited in the specification and claims, the technical solutions of the invention does not preclude the inclusion of other units and steps that are not directly or definitely recited. Moreover, such expressions as "first", "second", "third" and "fourth" do not represent a sequence of units or numeric values in terms of time, space, magnitude, etc.; rather, these expressions are merely used for distinguishing various units or numeric values.

FIG. 1 shows an architecture for a mobile device according to an embodiment of the invention.

As shown in FIG. 1, the mobile device 10 of the present embodiment comprises a communication manager 110, a communication router 120 and three safety entities SE1, SE2 and SE3. It can be understood that the number of safety entities shown in FIG. 1 is merely exemplary rather than limiting. Actually, the principle of the invention applies to various situations in which any number of safety entities are included in the mobile device.

The communication manager 110 can perform information interaction with the external device 20 and the safety entities SE1-SE2, and in response to an application request from the external device 20, the communication manager 110 can automatically select a corresponding safety entity and activate an application program associated with the application request stored in this safety entity. The external device 20 refers to such a device which is located outside the mobile device 20, and has an ability of communicating with the communication manager 110. Examples of the mobile device 20 include, but are not limited to, a POS terminal and a smart phone, etc.

With reference to FIG. 1, the communication manager 110 comprises a protocol manager 111, an application register 112 and a default application selection list 113.

The protocol manager 111 comprises a control module 111A, a protocol identification module 111B and a conflict detection module 111C, wherein the control module 111A is responsible for an interaction with the external device 10 and the selection of the safety entity, and further stores associated parameters of various communication protocols or transmission protocols and can update or modify these parameters; the protocol identification module 111B invokes a protocol parameter management module 111A to identify the transmission protocol involved in the application request from the external device so as to determine the type of protocol; the conflict detection module 111C is used for detecting whether there is a conflict between protocols when application requests from a plurality of external devices are received simultaneously.

The application register 112 stores information of application programs contained in each safety entity. Table 1 shows an exemplary application register.

TABLE 1

| SE identification domain | Protocol domain | Application identification domain |
| --- | --- | --- |
| SE1 | SWP | App3 |
| SE1 | TypeB | App1 |
| SE2 | TypeA | App2 |
| SE2 | TypeB | App1 |
| SE3 | TypeB | App1 |

In the above table, SE identification domain stores an identifier for identifying safety entity, the protocol domain stores the type of transmission protocol supported by each safety entity, and the application identification domain stores an identifier for identifying application programs. By means of this register, a mapping relationship between the safety entity and its transmission protocol and application programs can be established for each safety entity. Preferably in this embodiment, for each application program, it is given a unique identifier in each mobile device.

Figure 2:
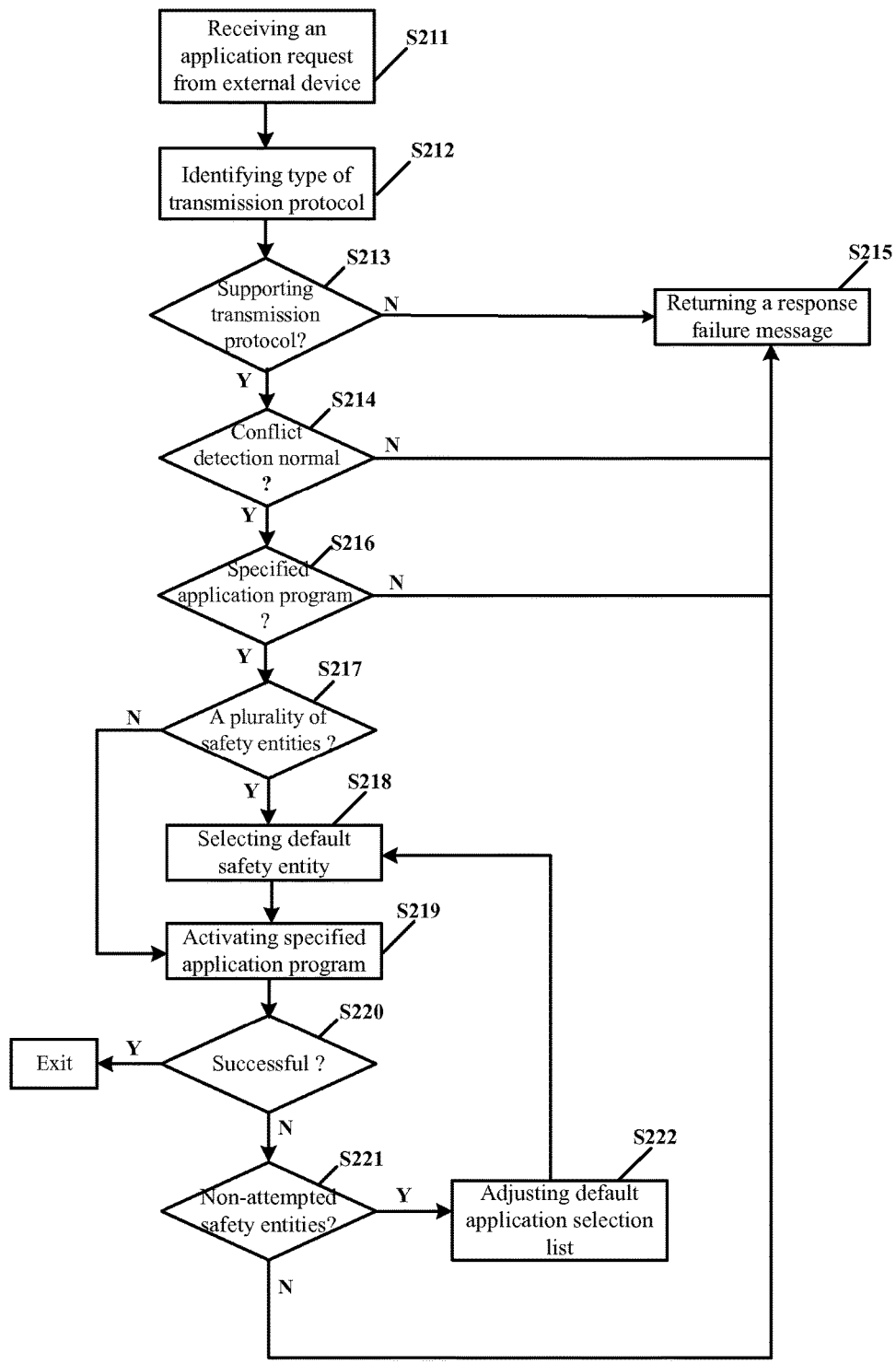
FIG. 2 is a flowchart of a method for activating application programs in a mobile device according to another embodiment of the invention.

The default application selection list 113 mainly serves to store a default safety entity of each application program, i.e., if the application program associated with the application request is in a plurality of safety entities, a default safety entity can be selected from this list and that application program in the default safety entity can be activated. FIG. 2 shows an exemplary default application selection list.

TABLE 2

| Application identification domain | Cyclic ordering selection domain |
| --- | --- |
| App3 | None |
| App2 | None |
| App1 | SE3, SE2, SE1 |

In table 2, the application identification domain stores an identifier for identifying application programs, the cyclic ordering selection domain stores the selection order of safety entities so as to provide a cyclic ordering selection mechanism. Specifically, under the action of this mechanism, for each application program, the SE identifiers of all the safety entities which contain this application program are stored in the cyclic ordering selection domain, and the ordering of them represent the order in which they are selected in sequence. For example, the first appearing SE identifier in this domain means that the corresponding safety entity is the default safety entity to be selected preferentially, and the remaining safety entities are alternative arranged in an order in which the respective SE identifiers appear. Preferably in this embodiment, when the application program in the default safety entity has a problem (e.g., failure in activating or performing), in addition to selecting the selected safety entities in order, the order of SE identifiers in the cyclic ordering selection domain is also adjusted. For example, the SE identifier of the current default safety entity is placed at the tail of the queue so that the SE identifier of the safety entity that was previously immediately behind it is at the head of the queue to become the default safety entity.

The default application selection list 113 can be configured by the user as required. For example, the user can make the configuration by himself using a human-machine interface (e.g., a visualized management interface), or when the user inserts the safety entity into the mobile device, a window will pop out in the human-machine interface to prompt the user to make the configuration.

Since the safety entities SE1-SE3 can be devices having different interface standards, the connection between the communication manager 110 and the safety entities SE1-SE3 needs to be managed. As shown in FIG. 1, as an interface, the communication router 120 is located between the communication manager 110 and the safety entities SE1-SE3 in order to provide a routing selection for the communication between the communication router 120 and different safety entities, e.g., including a connection between the communication router 120 and the safety entities having different interface standards. By means of the communication router 120, a function of routing data between the communication manager 110 and the safety entities SE1-SE3 can be achieved, thus more efficiently finishing the an automatic selection process of the safety entities.

It is worth noting that the communication manager 110 and the communication router 120 shown in FIG. 1 can be either implemented in a form of independent hardware circuits, or be functional entities. In the latter case, corresponding functions can be realized by means of softwares running on a general processor. In addition, the protocol manager 111 and the modules contained therein can be also implemented in a form of hardware circuits, or be implemented in a form of a general processor plus softwares. It is also noted that the application register 112 and the default application selection list 113 can be located at different storage area in the same memory, or can be located in different memories.

FIG. 2 is a flowchart of a method for activating application programs in a mobile device according to another embodiment of the invention. By way of example, it is herein assumed that the mobile device employs the structure shown in FIG. 1. However, it will be appreciated from the following description that the method of this embodiment is not dependent on a specific structure.

As shown in FIG. 2, at step S211, the mobile device 10 receives an application request from the external device 20 via a wireless channel or a wired connection. Then, the mobile device 10 performs step S212 so as to resolve the application request and identify the type of communication protocol or transmission protocol adopted by the external device 20. The transmission protocol between the mobile device and the external device can be based on various technologies, including but not limited to near field communication technology, Bluetooth technology and WiFi technology, etc. When a mobile device having the structure shown in FIG. 1 is used, the identification of transmission protocol can be accomplished by the protocol manager in the communication manager.

Then, the process proceeds to step S213 at which the mobile device 10 determines whether the safety entity contained therein supports the identified transmission protocol, if the safety entity supports the identified transmission protocol, the process proceeds to step S214; otherwise, the process proceeds to step S215 at which a message of response failure is transmitted to the external device 20. When the step S213 is executed, the protocol manager 111 can for example determine whether the mobile device contains a safety entity which supports the identified transmission protocol by looking up the application register 112.

At step S214, the protocol manager 111 conducts a conflict detection for the identified protocols; if the conflict detection is normal, a message of response success is returned to the external device 20, and the process proceeds to step S216; otherwise, the process proceeds to step S215 at which a message of response failure is transmitted to the external device 20.

At step S216, when the mobile device 10 receives an instruction from the external device 20 for activating a specified application program, the communication manager 110 accesses the application register 112 and determines whether the safety entity which supports the identified transmission protocol has the specified application program; if the safety entity has the specified application program, the process proceeds to step S217; otherwise, the process proceeds to step S215 at which a message of response failure is transmitted to the external device 20.

At step S217, the communication manager 110 further determines whether the mobile device has a plurality of safety entities storing the specified application program; if there are a plurality of such safety entities, the process proceeds to step S218; otherwise, the only one safety carried is selected to be the safety entity for which the specified application program has to be activated and the process proceeds to step S219.

At step S218, the communication manager 110 selects the default safety entity from a plurality of candidate safety entities as the safety entity for which the specified application program has to be activated. This step can be for example performed by looking up the default application selection list 113 by the protocol manager 111.

At step S219, the communication manager 110 establishes a connection with the selected safety entity by means of the communication router 120 and activates the specified application program.

After step S219, the process shown in FIG. 2 proceeds to step S220. At this step, the communication manager 110 will determine whether the specified application program has been successfully activated and performed. If it is determined that the specified application program has been successfully activated and performed, the process exits; otherwise, the process proceeds to step S221.

As step 221, the communication manager 110 determines whether there are non-attempted safety entities. If there are non-attempted safety entities, the process proceeds to step 222; otherwise, the process proceeds to step S215 at which a message of response failure is transmitted to the external device 20. Specifically, for a case in which there are a plurality of safety entities which store the specified application program, if they have not yet all attempted to activate the specified application program, the process proceeds to step 222; otherwise, the process proceeds to step S215; for a case in which there is only one safety entities which stores the specified application program, the process also proceeds to step S215.

As step 222, the communication manager 110 will make adjustment to the default application selection list 113 and set the safety entity which is immediately behind the current default safety entity as the default safety entity, and the process will return to step S218.

Figure 3:
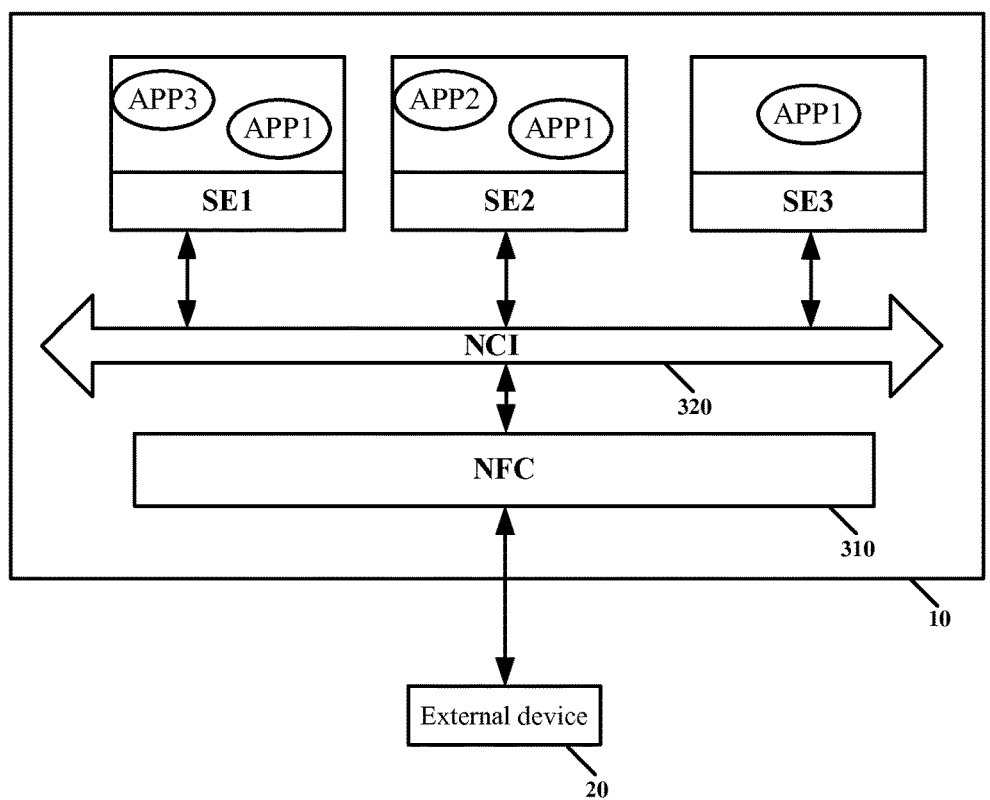
FIG. 3 shows an application scene where near field payment through NFC is implemented by using the exemplary mobile device having the architecture shown in FIG. 1.

FIG. 3 shows an application scene where near field payment through NFC is implemented by using the exemplary mobile device having the architecture shown in FIG. 1.

In the application scene shown in FIG. 3, the external device 20 is a financial POS machine having a near field communication (NFC) ability which merely supports TypeB protocol. The mobile device 10 is a smart phone having a NFC ability, on which three safety entities SE1, SE2 and SE3 are installed, wherein SE1 stores application programs App1 and App3, SE2 stores application programs App1 and App2, SE3 stores application programs App1, and the application register and the default application selection list in the smart phone are configured as shown in tables 1 and 2. Preferably, the function of the communication manager shown in FIG. 1 is in-built in a NFC chip 310, and the function of the communication router is realized by a NFC control interface 320 which satisfies NCI specification issued by NFC forum. It is worth noting that while the NFC control interface 320 shown herein is a separate component from the NFC chip 310, it can be also integrated into the NFC chip.

Taking a typical small amount payment application (e.g., a public traffic card swiping) as an example, firstly, the financial POS machine which serves as the external device 20 sends a connection request to the external device 10 (the smart phone herein). After receiving the NFC request, the NFC chip in the smart phone identifies that the type of the transmission protocol used in this communication is TypeB. Then, the smart phone determines whether the safety entity thereon supports the transmission protocol type TypeB. As can be known from table 1, each of SE1-SE3 contains application program App1 which supports this protocol. Therefore, the NFC chip will return a connection response to the financial POS machine.

Subsequently, the external POS machine sends a transaction command to the smart phone, which command comprises the specified application program App1 and associated transaction data. After receiving the transaction command, the NFC chip of the smart phone looks up the safety entity in which the specified application program is located by means of the in-built communication manager and the application register (e.g., table 1). As can be seen from table 1, in the example of this scene, all of the safety entities SE1, SE2 and SE3 support TypeB protocol and comprise the specified application program App1. Therefore, they are contained in the result of look-up.

Next, the communication manager in the NFC chip 310 will make a further screening to the look-up result using the default program list. The default application selection list shown in FIG. 2 indicates that the first choice default safety entity for the application program App1 is SE3. Therefore, the communication manager will establish a connection with the safety entity SE3 by means of the NFC control interface 320 and activate the application program App1 in the safety entity SE3.

If the performing of the application program App1 in the safety entity SE3 has failed (e.g., due to insufficient balance in the public traffic card), the communication manager will make adjustment to the cyclic ordering selection domain of this application program in the default application selection list. The original order of SE3, SE2, SE1 will be adjusted to be SE2, SE1, SE3 so that the safety entity SE2 becomes the default device which the application program App1 firstly chooses to activate. Thereafter, when this transaction is performed again, the communication manager automatically selects the safety entity SE2 as the default device to be activated.

The invention has the following advantages:

(1) A process in which application programs can be automatically found and selected in each safety entity on the mobile device can be well accomplished, especially for application programs having identical application identifiers on different safety entities.

(2) The configurable default application selection list mode used herein solves the selection problem under the circumstance of multiple safety entities for the same one application program, according to the principle of being as simple as possible.

(3) The cyclic ordering selection mechanism can re-select an available default SE device. No only the automatic finding and selecting method is better perfected, but also the using experience of users is better improved.

Since the invention can be carried out in various ways without departing from a basic spirit of the invention, the specific embodiments as described above are merely illustrative rather than limiting. The scope of the invention is defined by the appended claims, and various changes or modifications to the above described embodiments will fall within the scope of protection defined by the appended claims.

The invention claimed is:

1. A method for activating application programs on a mobile device, characterized in that the method comprises the following steps:
   receiving an application request from a device which is located outside the mobile device;
   identifying a transmission protocol associated with the application request; and
   determining that there are a plurality of safety entities in the mobile device which support the transmission protocol and store application programs associated with the application request, and activating an application program associated with the application request in a default safety entity;
   wherein a correlation between the safety entities and the transmission protocol being supported is stored in form of an application register table in an erasable non-volatile memory of the mobile device, the application register table includes an SE identification domain storing identifiers for identifying the safety entities, a protocol domain storing the type of the transmission protocols supported by each of the safety entities, and an application identification domain storing identifiers for identifying the application programs,
   for each of the application programs, the identifiers for identifying all of the safety entities containing one of the application programs are stored in a cyclic ordering selection domain, and the ordering of them represents the order in which they are selected in sequence.

2. The method for processing according to claim 1, wherein the transmission protocol is based on near field communication technology, Bluetooth technology or WiFi technology.

3. The method for processing according to claim 1, wherein each of the application programs is given a unique identifier in the mobile device.

4. The method for processing according to claim 1, wherein a correlation between the application program and the default safety entity is stored in the mobile device in a form of list.

5. The method for processing according to claim 1, wherein if the application program in the default safety entity has failed to be activated or performed, application programs associated with the application request in other safety entities are activated in a predetermined sequence.

6. The method for processing according to claim 1, wherein if the application program in the default safety entity has failed to be activated or performed, other safety entities are set as the default safety entity.

7. A mobile device, be characterized in comprising:
   a plurality of safety entities configured to store application programs;

a communication manager configured to, in response to an application request from a device which is located outside the mobile device, activates the operation of an application program associated with the application request; and an interface between the safety entities and the communication manager, wherein the communication manager activates the operation of an application program associated with the application request in the following way:

identifying a transmission protocol associated with an application request, determining that there are a plurality of safety entities which support the transmission protocol associated with the application request and store application programs associated with the application request, and the communication manager activates an application program associated with the application request in a default safety entity;

wherein a correlation between the safety entities and the transmission protocol being supported is stored in form of an application register table in an erasable non-volatile memory of the mobile device, the application register table includes an SE identification domain storing identifiers for identifying the safety entities, a protocol domain storing the type of the transmission protocols supported of the safety entities, and an application identification domain storing an identifiers for identifying the application programs, for each of the application programs, the identifiers for identifying all of the safety entities containing one of the application programs are stored in a cyclic ordering selection domain, and the ordering of them represents the order in which they are selected in sequence.

8. The mobile device according to claim 7, wherein the communication manager is an integrated circuit chip having a near field communication function, and the interface conforms to NCI specifications.

9. The mobile device according to claim 7, wherein each of the application programs is given a unique identifier in the mobile device.

10. The mobile device according to claim 7, further comprising an erasable non-volatile memory configured to store a list of correlation between the application program and the default safety entity.

11. The mobile device according to claim 7, wherein if the application program in the default safety entity has failed to be activated or performed, the communication manager activates application programs associated with the application request in other safety entities in a predetermined sequence.

12. The mobile device according to claim 7, wherein if the application program in the default safety entity has failed to be activated or performed, the communication manager sets other safety entities as the default safety entity.

* * * * *